(12) United States Patent
Kawabe

(10) Patent No.: US 11,514,636 B2
(45) Date of Patent: Nov. 29, 2022

(54) IMAGE GENERATION DEVICE, IMAGE GENERATION METHOD, AND PROGRAM

(71) Applicant: NIPPON TELEGRAPH AND TELEPHONE CORPORATION, Tokyo (JP)

(72) Inventor: Takahiro Kawabe, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 39 days.

(21) Appl. No.: 17/263,118

(22) PCT Filed: Jul. 1, 2019

(86) PCT No.: PCT/JP2019/026028
§ 371 (c)(1),
(2) Date: Jan. 25, 2021

(87) PCT Pub. No.: WO2020/026670
PCT Pub. Date: Feb. 6, 2020

(65) Prior Publication Data
US 2021/0150796 A1 May 20, 2021

(30) Foreign Application Priority Data

Jul. 30, 2018 (JP) .............................. JP2018-142166

(51) Int. Cl.
*G06T 13/80* (2011.01)
*G06T 3/00* (2006.01)

(52) U.S. Cl.
CPC ............ *G06T 13/80* (2013.01); *G06T 3/0012* (2013.01); *G06T 2210/24* (2013.01)

(58) Field of Classification Search
CPC . G06F 12/0855; G06F 12/0864; G06T 13/80; G06T 2210/24; G06T 2210/62; G06T 3/0012
See application file for complete search history.

(56) References Cited

U.S. PATENT DOCUMENTS 8,160,398 B1 * 4/2012 Avidan ................. H04N 1/3875
345/660
2010/0118035 A1 * 5/2010 Yamakami .............. G06F 16/70
345/473

(Continued)

FOREIGN PATENT DOCUMENTS

JP            6069115 B2     1/2017

*Primary Examiner* — Ming Wu

(57) ABSTRACT

A visual perception of an arbitrary transparent material is imparted to an arbitrary image. In accordance with each element of each deformation map included in a sequence of deformation maps that correspond to a time series, each element of a target image is moved to obtain each deformed image of the time series. Each element of each of the deformation maps indicates a movement direction and a movement amount of each pixel of the target image corresponding to the element. Each deformation map included in a sequence of deformation maps corresponding to a first time interval in the time series corresponds to each of two-dimensional arrays obtained by moving, in a first direction, elements of two-dimensional arrays corresponding to immediately-previous deformation maps, and each deformation map included in a sequence of deformation maps corresponding to a second time interval in the time series corresponds to each of two-dimensional arrays obtained by moving, in a second direction, elements of two-dimensional arrays corresponding to immediately-previous deformation maps. Here, the first direction and the second direction differ from one another.

12 Claims, 6 Drawing Sheets

(56) References Cited

U.S. PATENT DOCUMENTS

2012/0063685 A1* 3/2012 Chamaret .............. G06T 3/0012
  382/293
2013/0120407 A1* 5/2013 Intwala ................. G06T 3/0012
  345/530
2018/0266452 A1* 9/2018 Di Carlo .................. C08J 3/075

* cited by examiner

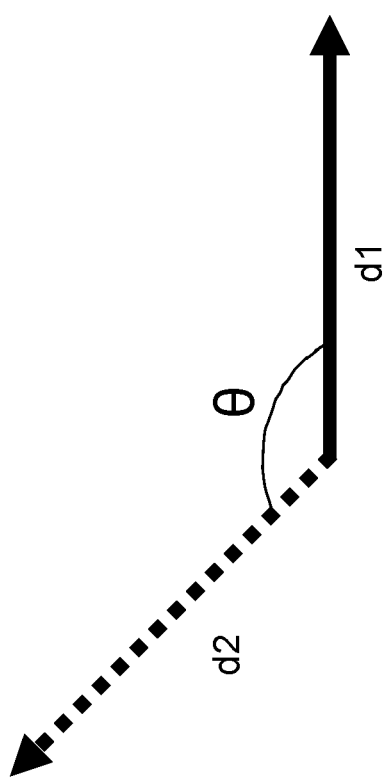

IMAGE GENERATION DEVICE, IMAGE GENERATION METHOD, AND PROGRAM

CROSS-REFERENCE TO RELATED APPLICATIONS

This application is a U.S. 371 Application of International Patent Application No. PCT/JP2019/026028, filed on 1 Jul. 2019, which application claims priority to and the benefit of JP Application No. 2018-142166, filed on 30 Jul. 2018, the disclosures of which are hereby incorporated herein by reference in their entireties.

TECHNICAL FIELD

The present invention relates to an image processing technique and, in particular, relates to a technique for imparting a visual perception of a transparent or translucent material to an arbitrary image.

BACKGROUND ART

Generally, in order to impart a visual perception (hereinafter, referred to as a "transparent material perception") of a transparent or translucent material (hereinafter, referred to as a "transparent material") to an arbitrary image, physical properties of the transparent material and properties of light that is reflected, transmitted, absorbed, or refracted by a surface of the transparent material must be simulated and the simulation must be rendered and imaged using computer graphics technology.

On the other hand, there are methods of imparting a transparent material perception to an arbitrary image using simple image processing that does not utilize sophisticated techniques requiring that users be relatively knowledgeable about the physical properties of a transparent material and simulation and rendering of light (for example, refer to Patent Literature 1). Generally, since transparent materials that exist in the world have a refractive index of 1 or higher, when an object that differs from a transparent material is present behind the transparent material, image information of the object undergoes deformation. In Patent Literature 1, by dynamically imitating the image deformation with image processing or, in other words, by applying image processing on an image of an arbitrary object so as to dynamically deform the image, an image of the object imparted with a transparent material perception is obtained.

CITATION LIST

Patent Literature

[Patent Literature 1] Japanese Patent No. 6069115

SUMMARY OF THE INVENTION

Technical Problem

With the method proposed in Patent Literature 1, according to image processing (hereinafter, referred to as "dynamic image deformation processing") which dynamically deforms (hereinafter, referred to as "dynamic image deformation") an arbitrary image, a transparent material perception can be imparted to the image and, in particular, a perception of a fluid such as a liquid among transparent materials can be imparted to the image. On the other hand, with the method proposed in Patent Literature 1, a perception of solids among transparent materials is not intended to be imparted to images.

The present invention has been made in consideration of such points and an object thereof is to impart a perception of an arbitrary transparent material to an arbitrary image.

Means for Solving the Problem

In the present invention, in accordance with each element of each deformation map included in a sequence of deformation maps that correspond to a time series, each element of a target image is moved to obtain each deformed image of the time series. Each element of each of the deformation maps indicates a movement direction and a movement amount of each pixel of the target image corresponding to the element. Each deformation map included in a sequence of deformation maps corresponding to a first time interval in the time series corresponds to each of two-dimensional arrays obtained by moving, in a first direction, elements of two-dimensional arrays corresponding to immediately-previous deformation maps, and each deformation map included in a sequence of deformation maps corresponding to a second time interval in the time series corresponds to each of two-dimensional arrays obtained by moving, in a second direction, elements of two-dimensional arrays corresponding to immediately-previous deformation maps. Here the first direction and the second direction differ from one another.

Effects of the Invention

According to the above, a perception of an arbitrary transparent material can be imparted to an arbitrary image.

BRIEF DESCRIPTION OF DRAWINGS

FIG. 6 is a conceptual diagram for explaining an angle formed between two movement directions.

DESCRIPTION OF EMBODIMENTS

Hereinafter, embodiments of the present invention will be described with reference to the drawings.

First Embodiment

In the method proposed in Patent Literature 1 described above, by using deformation maps (sometimes also referred to as a "distortion distribution") to perform image processing (hereinafter, referred to as "dynamic image deformation processing") which dynamically deforms an arbitrary image (hereinafter, referred to as a "target image") of a deformation object and obtaining a deformed image of a plurality of frames (in other words, a plurality of deformed images of a time series: hereinafter, referred to as a "dynamically deformed image sequence"), a transparent material perception is imparted to the target image. With this method, a perception of particularly a fluid such as a liquid among transparent materials can be imparted to the target image. On the other hand, with the method proposed in Patent Literature 1, a perception of a solid among transparent materials is not intended to be imparted to an image. In actuality, a long-term dynamically deformed image sequence obtained by the method proposed in Patent Literature 1 does not include a component of linear movement that contributes toward perception of a solid.

Figure 2:
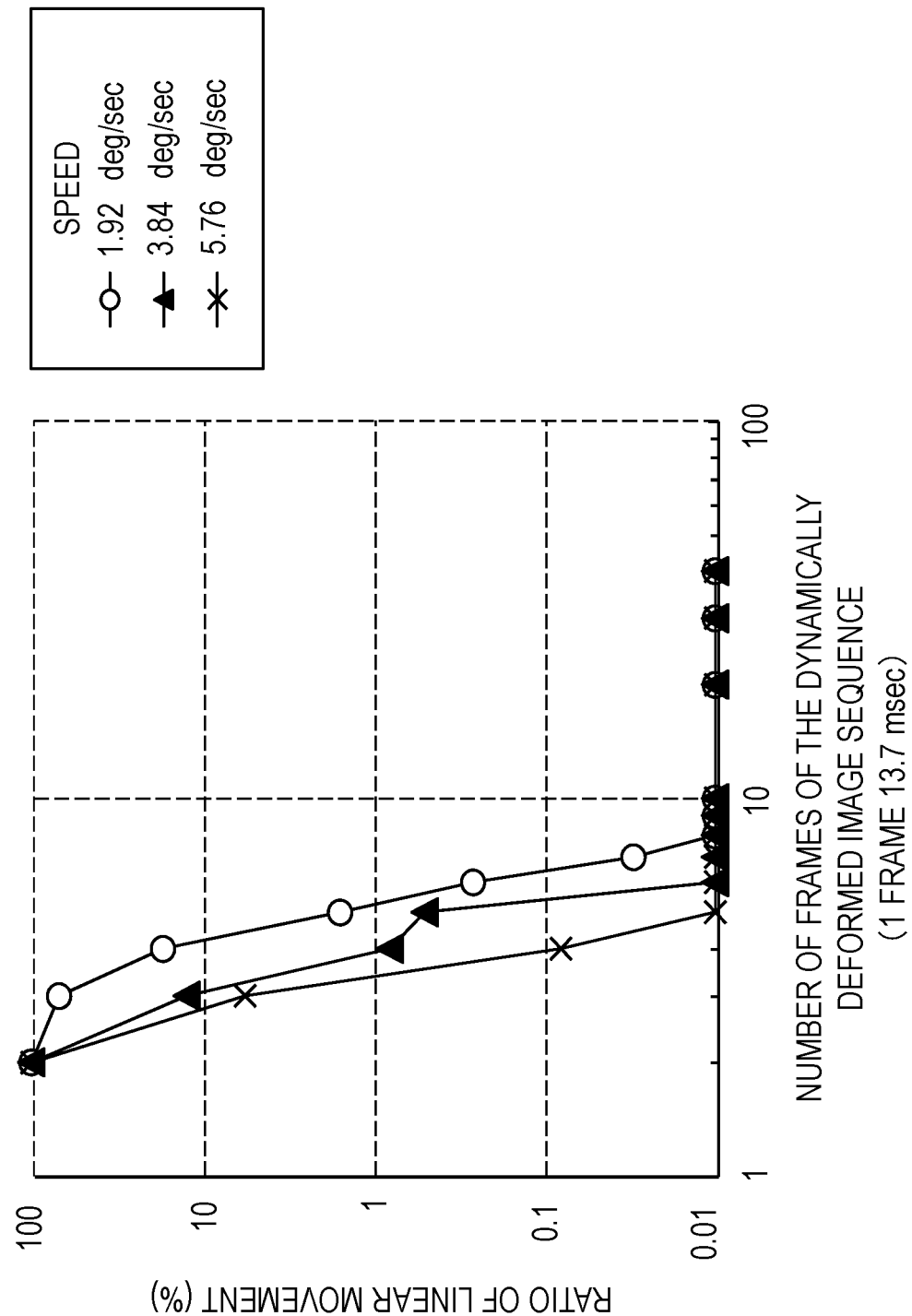
FIG. 2 is a graph exemplifying a relationship among a ratio of linear movement that is included in an image, the number of presented frames, and a movement speed.

FIG. 2 represents a calculation of an optical flow (a pixel movement pattern between frames) of a dynamically deformed image sequence generated by the method proposed in Patent Literature 1, in which a ratio of linear movement components of pixels (movements of pixels that move in a straight line between frames) contained in the optical flow is plotted for each number of frames of the dynamically deformed image sequence used in the calculation. A presentation time per frame in this case is 13.7 msec. It is revealed that, as the number of frames of the dynamically deformed image sequence increases, the ratio of linear movements included in the optical flow decreases. In particular, when the presentation time of the dynamically deformed image sequence exceeds 167 msec, the dynamically deformed image sequence contains hardly any linear movement. Since recognition by an observer that an arbitrary object includes a rigid body requires that the object contain a component that performs linear movement, when the presentation time of the dynamically deformed image sequence generated by the method proposed in Patent Literature 1 exceeds 167 msec, the observer is conceivably more likely to perceive a perception of a transparent material that is a fluid such as a liquid from the dynamically deformed image sequence.

In the present embodiment, by obtaining a dynamically deformed image sequence in which a linear movement component is continuously included in an optical flow, a perception of a solid transparent material is imparted to a target image. Hereinafter, as an example, devising deformation maps to be used in a pixel-warping method (also referred to as an "image-warping method") will be described.

First, the prerequisite pixel-warping method that is a general image deformation method will be described (for example, refer to Reference 1).

[Reference 1] Kawabe, T., Maruya, K., & Nishida, S., "Perceptual transparency from image deformation," Proceedings of the National Academy of Sciences, Aug. 18, 2015, 112(33), E4620-E4627, [retrieved 12 Jun. 2018], Internet <https://doi.org/10.1073/pnas.1500913112>

In the pixel-warping method, deformation maps are used to perform image deformation of a target image and obtain a deformed image. The following description assumes that the target image is an image with X-number of pixels in a horizontal direction and Y-number of pixels in a vertical direction or, in other words, an image in which pixel values of X×Y-number of pixels constitute respective elements of a two-dimensional array, where X and Y are positive integers. Each of the deformation maps is a two-dimensional array with X×Y-number of elements of which the number of elements in the horizontal direction and the number of elements in the vertical direction are the same as those of the target image. Each element of the deformation maps may assume any value of a positive number, a negative number, and zero. Each element of the deformation maps corresponds to each pixel of the target image and indicates a movement direction and a movement amount of each corresponding pixel. In other words, when a coordinate of the two-dimensional array in the horizontal direction is expressed as x (where x is a number satisfying 1≤x≤X), a coordinate of the two-dimensional array in the vertical direction is expressed as y (where y is a number satisfying 1≤y≤Y), and coordinates are expressed as (x, y), an element e(x, y) of each of the coordinates (x, y) of the deformation maps indicates a movement direction and a movement amount of a pixel p(x, y) of each of the coordinates (x, y) of the target image. The movement direction is represented by a sign of the element e(x, y) and the movement amount is represented by an absolute value of the element e(x, y). In the pixel-warping method, in order to independently represent movements of a pixel in the horizontal direction and the vertical direction, two types of deformation maps, namely, a deformation map (hereinafter, referred to as a "horizontal deformation map") representing a pixel movement in the horizontal direction and a deformation map (hereinafter, referred to as a "vertical deformation map") representing a pixel movement in the vertical direction are used. In other words, in the pixel-warping method, a horizontal deformation map and a vertical deformation map are used to perform both a movement in the horizontal direction and a movement in the vertical direction of a pixel of the target image. For example, when an element value of an element $e_H(x, y)$ in the horizontal deformation map is 1, a pixel p(x, y) in the target image is moved rightward by 1, and when the element value of the element $e_H(x, y)$ in the horizontal deformation map is −1, the pixel p(x, y) in the target image is moved leftward by 1. In addition, when an element value of an element $e_V(x, y)$ in the vertical deformation map is 1, the pixel p(x, y) in the target image is moved upward by 1, and when the element value of the element $e_V(x, y)$ in the vertical deformation map is −1, the pixel p(x, y) in the target image is moved downward by 1. In the pixel-warping method, by performing both a movement of a pixel using a horizontal deformation map and a movement of the pixel using a vertical deformation map, a deformed image that corresponds to both the horizontal deformation map and the vertical deformation map with respect to a target image is obtained.

In addition, in the pixel-warping method, such horizontal deformation maps and vertical deformation maps are prepared with respect to respective K-number of successive frames, and by performing a deformation corresponding to each of the horizontal deformation maps and each of the vertical deformation maps of each frame with respect to a same target image, a sequence of deformed images of the K-number of frames is obtained, where K is an integer that is equal to or larger than 3. The sequence of deformed images of the K-number of frames which is obtained in this manner is a "dynamically deformed image sequence". Hereinafter, a sequence of K-number of horizontal deformation maps and a sequence of K-number of vertical deformation maps for generating a dynamically deformed image sequence constituted by K-number of frames are respectively referred to as a "horizontal-direction three-dimensional deformation map" and a "vertical-direction three-dimensional deformation map". In addition, a pair of a horizontal-direction three-dimensional deformation map and a vertical-direction three-dimensional deformation map will be referred to as "three-dimensional deformation maps". It should be noted that a horizontal-direction three-dimensional deformation map and a vertical-direction three-dimensional deformation map are respectively three-dimensional arrays of X-number of pixels in the horizontal direction, Y-number of pixels in the vertical direction and K-number of frames.

The method proposed in Patent Literature 1 generates a dynamically deformed image sequence by using three-dimensional deformation maps (hereinafter, referred to as "three-dimensional deformation maps given only one-way movement") which is a pair of a horizontal-direction three-dimensional deformation map that is a sequence of K-number of horizontal-direction deformation maps and a vertical-direction three-dimensional deformation map that is a sequence of K-number of vertical-direction deformation maps obtained by moving (one-way movement) respective elements $e_H(x, y)$ and $e_V(x, y)$ of a single given horizontal deformation map and a single given vertical deformation map in a single given direction so that a movement amount increases as frames progress to perform a deformation corresponding to the three-dimensional deformation maps with respect to a target image. In the present embodiment, by devising three-dimensional deformation maps, a perception of a solid transparent material is imparted to a target image. A detailed description will be given below.

<Configuration and Processing of Image Generation Apparatus According to Present Embodiment>

Figure 1:
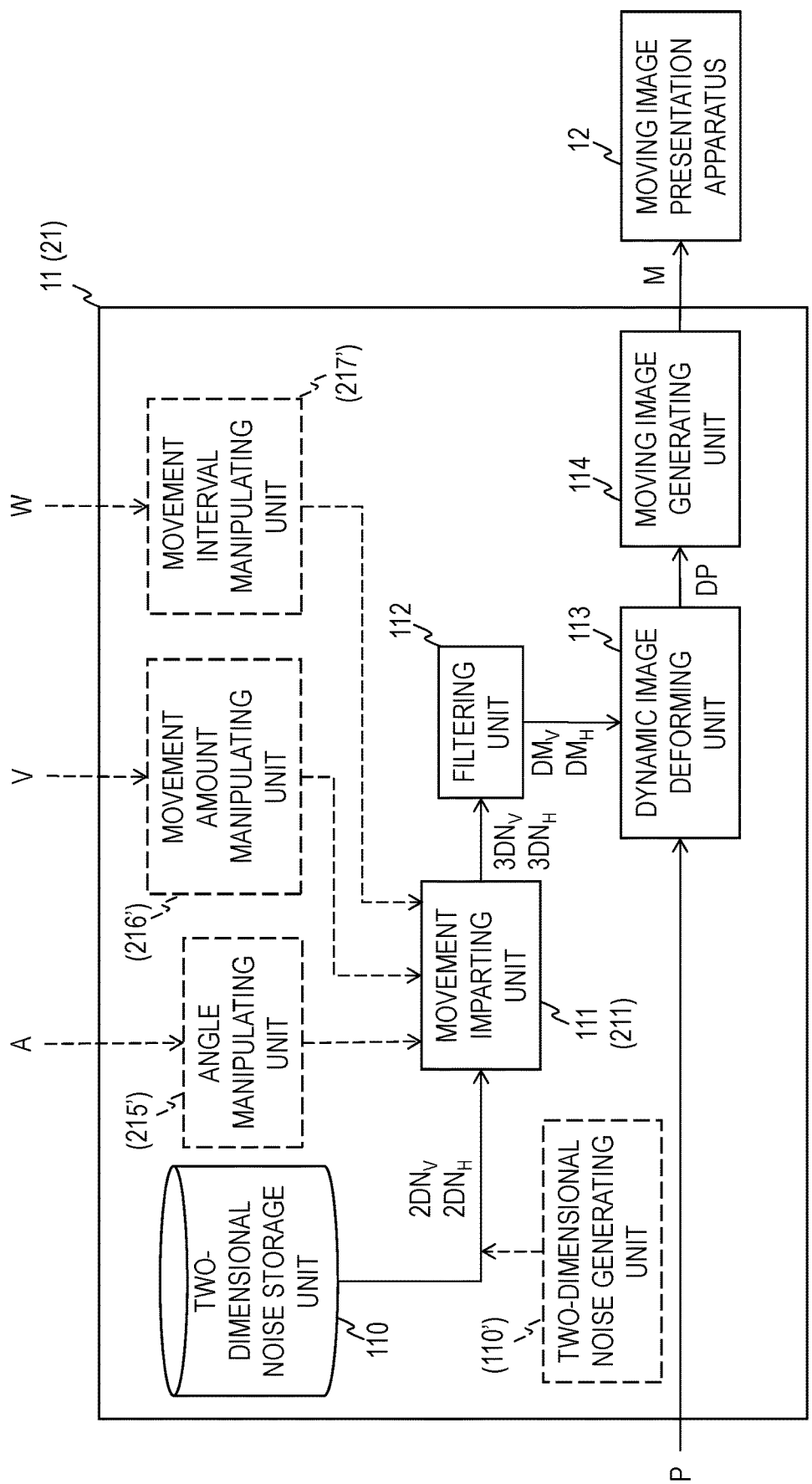
FIG. 1 is a block diagram illustrating a functional configuration of an image generation apparatus according to an embodiment.

As exemplified in FIG. 1, an image generation apparatus 11 according to the present embodiment has a two-dimensional noise storage unit 110, a movement imparting unit 111, a filtering unit 112, a dynamic image deforming unit 113, and a moving image generating unit 114. The image generation apparatus 11 generates a moving image by imparting a visual perception of material to an input target image P and outputs the generated moving image, whereby the moving image generated by the image generation apparatus 11 is presented from a moving image presentation apparatus 12.

<Input to Image Generation Apparatus 11>

An arbitrary target image P is input to the image generation apparatus 11. The target image P is an image of which the number of pixels in a horizontal direction is a positive integer X and the number of pixels in a vertical direction is a positive integer Y or, in other words, an image in which pixel values of X×Y-number of pixels constitute respective elements of a two-dimensional array. A pixel at coordinates (x, y) that satisfy 1≤x≤X and 1≤y≤Y of the target image P is expressed as p(x, y). The target image P input to the image generation apparatus 11 is input to the dynamic image deforming unit 113.

<Two-Dimensional Noise>

Two two-dimensional noises $2DN_V(0)$ and $2DN_H(0)$ are stored in the two-dimensional noise storage unit 110 in advance. The two-dimensional noises $2DN_V(0)$ and $2DN_H(0)$ are, respectively, a two-dimensional array with X×Y-number of elements of which the number of elements in the horizontal direction is X and the number of elements in the vertical direction is Y. Hereinafter, an element at coordinates (x, y) that satisfy 1≤x≤X and 1≤y≤Y of the two-dimensional noise $2DN_V(0)$ will be expressed as $n_V(x, y)$. In a similar manner, an element at coordinates (x, y) that satisfy 1≤x≤X and 1≤y≤Y of the two-dimensional noise $2DN_H(0)$ will be expressed as $n_H(x, y)$. Each of the elements $n_V(x, y)$ and $n_H(x, y)$ may assume any value of a positive number, a negative number, and zero. For example, two-dimensional noises $2DN_V(0)$ and $2DN_H(0)$ having values randomly extracted from a uniform distribution or a normal distribution as respective elements $n_V(x, y)$ and $n_H(x, y)$ may be generated in advance and stored in the two-dimensional noise storage unit 110. Alternatively, a two-dimensional noise generating unit 110' may be provided in the image generation apparatus 11 in place of the two-dimensional noise storage unit 110, in which case the two-dimensional noise generating unit 110' may randomly extract values from a uniform distribution or a normal distribution as the respective elements $n_V(x, y)$ and $n_H(x, y)$ to generate the two-dimensional noises $2DN_V(0)$ and $2DN_H(0)$. Furthermore, $n_V(x, y)$ and $n_H(x, y)$ may be the same or may differ from one another.

<Movement Imparting Processing>

The two-dimensional noises $2DN_V(0)$ and $2DN_H(0)$ are input to the movement imparting unit 111. Using the two-dimensional noise $2DN_V(0)$, the movement imparting unit 111 generates and outputs K-number of two-dimensional noises $2DN_V(k)$ (where k=1, . . . , K) having elements of coordinates (x, y) which each satisfy 1≤x≤X and 1≤y≤Y. In addition, using the two-dimensional noise $2DN_H(0)$, the movement imparting unit 111 generates and outputs K-number of two-dimensional noises $2DN_H(k)$ (where k=1, . . . , K) having elements of coordinates (x, y) which each satisfy 1≤x≤X and 1≤y≤Y. Hereinafter, a sequence of the generated two-dimensional noises $2DN_V(1)$, . . . , $2DN_V(K)$ will be referred to as a three-dimensional noise $3DN_V$ and a sequence of the generated two-dimensional noises $2DN_H(1)$, . . . , $2DN_H(K)$ will be referred to as a three-dimensional noise $3DN_H$. The three-dimensional noises $3DN_V$ and $3DN_H$ respectively have X×Y×K-number of elements. In this case, K denotes the number of frames of a moving image M to be output by the image generation apparatus 11 which is assumed to be a value that is an even multiple of the number of frames T over which a one-way movement is continued in the moving image M. The number of frames T over which a one-way movement is continued in the moving image M and the number of frames K of the moving image M may be input to an input unit (not illustrated) provided in the image generation apparatus 11 from outside of the image generation apparatus 11 and subsequently input to the movement imparting unit 111. In addition, since K is an even multiple of T, when the even number is expressed as 2×(μ+1), a relationship expressed as K=2×(μ+1) x T is satisfied, where p is an integer that is equal to or larger than 0. In consideration thereof, instead of inputting the values of T and K, values of T and (μ+1) may be input or values of K and (μ+1) may be input. Alternatively, the values may be stored in advance in the movement imparting unit 111.

First, using a movement amount D set in advance, the movement imparting unit 111 obtains two-dimensional noises $2DN_V(1)$, . . . , $2DN_V(T)$ and two-dimensional noises $2DN_H(1)$, . . . , $2DN_H(T)$ having elements that are the respective elements $n_V(x, y)$ and $n_H(x, y)$ of the two-dimensional noise $2DN_V(0)$ and the two-dimensional noise $2DN_H(0)$ having been moved in a single direction (a d1 direction) set in advance by a movement amount of k x D. In other words, with respect to k=1, . . . , T, every time the value of k increases by 1, a two-dimensional noise $2DN_V(k)$ and a two-dimensional noise $2DN_H(k)$ are obtained which have elements that are the respective elements of an immediately previous two-dimensional noise $2DN_V(k-1)$ and an immediately previous two-dimensional noise $2DN_H(k-1)$ having been moved in a single direction (the d1 direction) set in advance by the movement amount D. In addition, with respect to each element of which a value of the element was not obtained by the movement described above among the two-dimensional noises $2DN_V(1), \ldots, 2DN_V(T)$ and the two-dimensional noises $2DN_H(1), \ldots, 2DN_H(T)$, the movement imparting unit 111 sets a value randomly extracted from a uniform distribution or a normal distribution. It should be noted that elements that end up being outside of a range of an X×Y two-dimensional array as a result of the movement described above are not to be included in the two-dimensional noises $2DN_V(1), \ldots, 2DN_V(T)$ and the two-dimensional noises $2DN_H(1), \ldots, 2DN_H(T)$.

In addition, the movement imparting unit 111 obtains two-dimensional noises $2DN_V(0), \ldots, 2DN_V(T-1)$ having been sorted in a reverse order as two-dimensional noises $2DN_V(T+1), \ldots, 2DN_V(2T)$. In other words, the movement imparting unit 111 obtains the two-dimensional noises $2DN_V(T+1), \ldots, 2DN_V(2T)$ by adopting each two-dimensional noise $2DN_V(k)$ as each two-dimensional noise $2DN_V(2T-k)$ with respect to $k=0, \ldots, T-1$. Furthermore, the movement imparting unit 111 obtains two-dimensional noises $2DN_H(0), \ldots, 2DN_H(T-1)$ having been sorted in a reverse order as two-dimensional noises $2DN_H(T+1), \ldots, 2DN_H(2T)$. In other words, the movement imparting unit 111 obtains the two-dimensional noises $2DN_H(T+1), \ldots, 2DN_H(2T)$ by adopting each two-dimensional noise $2DN_H(k)$ as each two-dimensional noise $2DN_H(2T-k)$ with respect to $k=0, \ldots, T-1$. Specifically, with respect to $k=T+1, \ldots, 2T$, every time the value of k increases by 1, a two-dimensional noise $2DN_V(k)$ and a two-dimensional noise $2DN_H(k)$ are obtained which have elements that are the respective elements of an immediately previous two-dimensional noise $2DN_V(k-1)$ and an immediately previous two-dimensional noise $2DN_H(k-1)$ having been moved in an opposite direction to the case of $k=1, \ldots, T$ (an opposite direction to the d1 direction or, in other words, a d2 direction that forms an angle of 180 degrees with the d1 direction) by a movement amount of D.

Furthermore, the movement imparting unit 111 outputs a sequence of two-dimensional noises $2DN_V(1), \ldots, 2DN_V(2T), \ldots, 2DN_V(1+p\times2T), \ldots, 2DN_V(2T+p\times2T)$ obtained by repetitively arranging the two-dimensional noises $2DN_V(1), \ldots, 2DN_V(2T)$ once or a plurality of times (µ+1-number of times) or, in other words, a sequence of the two-dimensional noises $2DN_V(1), \ldots, 2DN_V(K)$ as a three-dimensional noise $3DN_V$.

In addition, the movement imparting unit 111 outputs a sequence of two-dimensional noises $2DN_H(1), \ldots, 2DN_H(2T), \ldots, 2DN_H(1+p\times2T), \ldots, 2DN_H(2T+\mu\times2T)$ obtained by repetitively arranging the two-dimensional noises $2DN_H(1), \ldots, 2DN_H(2T)$ once or a plurality of times (µ+1-number of times) or, in other words, a sequence of the two-dimensional noises $2DN_H(1), \ldots, 2DN_H(K)$ as a three-dimensional noise $3DN_H$.

<Filtering Processing>

The three-dimensional noises $3DN_V$ and $3DN_H$ obtained by the movement imparting unit 111 are input to the filtering unit 112. The filtering unit 112 applies, with respect to each two-dimensional noise $2DN_V(k)$ of $k=1, \ldots, K$ included in the three-dimensional noise $3DN_V$, a low-pass filter in a spatial frequency domain (the filtering unit 112 filters each two-dimensional noise $2DN_V(k)$ of $k=1, \ldots, K$ with a low-pass filter) to obtain each vertical deformation map (each two-dimensional noise) $DM_V(k)$, and outputs a sequence constituted by the obtained vertical deformation maps (two-dimensional noises) $DM_V(k)$ as a vertical-direction three-dimensional deformation map (a three-dimensional noise) $DM_V$. In a similar manner, the filtering unit 112 applies, with respect to each three-dimensional noise $2DN_H(k)$ of $k=1, \ldots, K$ included in the three-dimensional noise $3DN_H$, a low-pass filter in a spatial frequency domain to obtain each horizontal deformation map (each two-dimensional noise) $DM_H(k)$, and outputs a sequence constituted by the obtained horizontal deformation maps (two-dimensional noises) $DM_H(k)$ as a horizontal-direction three-dimensional deformation map (a three-dimensional noise) $DM_H$. A cutoff spatial frequency of the low-pass filter is desirably 3 cpd or lower (refer to Patent Literature 1 and the like).

<Dynamic Image Deformation Processing>

Figure 3:
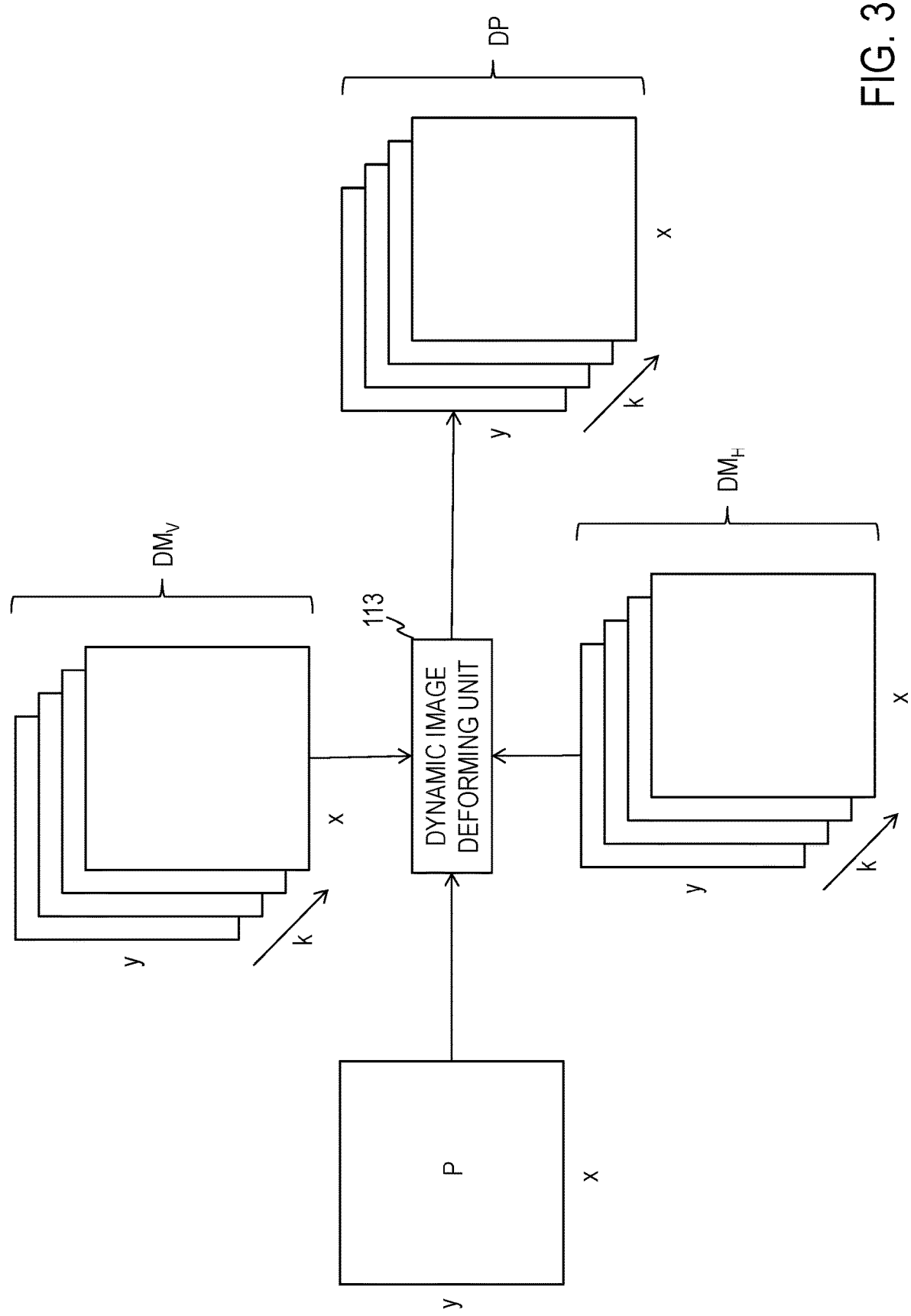
FIG. 3 is a conceptual diagram for exemplifying dynamic image deformation processing according to an embodiment.

The target image P input to the image generation apparatus 11 and the vertical-direction three-dimensional deformation map $DM_V$ and the horizontal-direction three-dimensional deformation map $DM_H$ obtained by the filtering unit 112 are input to the dynamic image deforming unit 113. As shown in FIG. 3, by subjecting the target image P to deformations corresponding to the vertical-direction deformation maps $2DN_V(k)$ and the horizontal-direction deformation maps $2DN_H(k)$ of $k=1, \ldots, K$ respectively included in the vertical-direction three-dimensional deformation map $DM_V$ and the horizontal-direction three-dimensional deformation map $DM_H$, the dynamic image deforming unit 113 obtains a dynamically deformed image sequence DP that is a sequence of deformed images DP(k) (where $k=1, \ldots, K$) of K-number of frames and outputs the dynamically deformed image sequence DP. A detailed description will now be given. An element of coordinates (x, y) of each vertical deformation map $DM_V(k)$ that is included in the vertical-direction three-dimensional deformation map $DM_V$ is expressed as $e_V(x, y, k)$ and an element of coordinates (x, y) of each horizontal deformation map $DM_H(k)$ that is included in the horizontal-direction three-dimensional deformation map $DM_H$ is expressed as $e_H(x, y, k)$, where $k=1, \ldots, K$, $1 \le x \le X$, and $1 \le y \le Y$. With respect to each of $k=1, \ldots, K$, the dynamic image deforming unit 113 obtains a deformed image DP(k) by moving each pixel p(x, y) of the target image P by $e_H(x, y, k)$ in the horizontal direction and, further, by $e_V(x, y, k)$ in the vertical direction, and outputs a sequence DP(1), ..., DP(K) of the obtained deformed images as the dynamically deformed image sequence DP.

<Moving Image Generation Processing>

The dynamically deformed image sequence DP is input to the moving image generating unit 114. The moving image generating unit 114 generates a moving image M obtained by arranging the sequence DP(1), ..., DP(K) of the deformed images DP(k) in a time-series direction at a predetermined frame rate and outputs the moving image M. The moving image M is input to the moving image presentation apparatus 12, and the moving image presentation apparatus 12 presents the moving image M to an observer. For example, the moving image M is displayed on a display apparatus such as a liquid-crystal display apparatus or projected by a projector apparatus. The observer having observed the moving image M perceives as though a transparent material perception of a solid has been imparted to the target image P. In other words, the observer is given an illusion that a solid substance (such as glass) with a transparent material perception is present between the target image P and the observer.

Feature of Present Embodiment

As described above, in the present embodiment, a transparent material perception of a solid can be imparted to an arbitrary target image P without having to use sophisticated techniques requiring that users be relatively knowledgeable about the physical properties of a transparent material and simulation and rendering of light.

Figure 4:
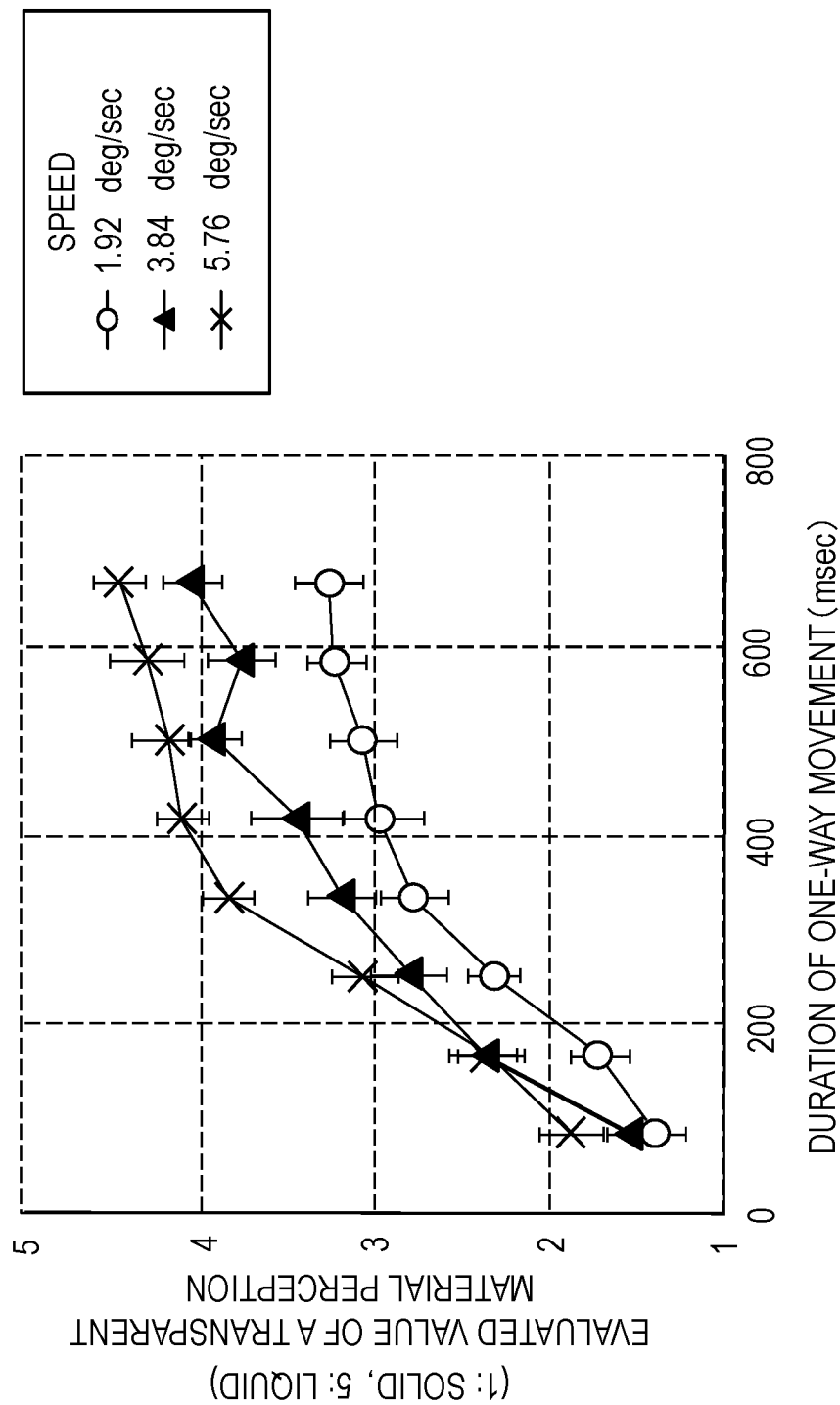
FIG. 4 is a graph exemplifying a relationship among a duration of one-way movement, a movement speed, and an evaluated value of a transparent material perception.

FIG. 4 shows, when using three-dimensional deformation maps imparted with a reciprocal movement, a relationship among a duration of a one-way movement included in the reciprocating movement, a movement speed, and an evaluated value of a transparent material perception with respect to a moving image of a dynamically deformed image sequence obtained based on the duration and the movement speed. The evaluated value of the transparent material perception is an average value of evaluation results on a scale of one to five with respect to a solid-likeness or liquid-likeness of the transparent material perception that the observer perceives from the moving image. The evaluated value when a highest solid-likeness is evaluated is 1, and the evaluated value when a highest liquid-likeness is evaluated is 5. As exemplified in FIG. 4, when a movement speed is low and the duration of one-way movement is short, the transparent material perception that the observer perceives from the moving image becomes biased to a transparent material perception of a solid. The example shown in FIG. 4 reveals that, when the presentation time of one-way movement at a speed of 1.92 deg/sec is approximately 300 msec or shorter, the presentation time at a speed of 3.84 deg/sec is 250 msec or shorter, or the presentation time at a speed of 5.76 deg/sec is 180 msec or shorter, the evaluated value is 3 or less, suggesting that a solid transparent material is likely to be perceived. Therefore, in order to impart a perception of a solid transparent material to a target image, a movement speed and a duration at which a solid transparent material is often perceived may be set.

Figure 5:
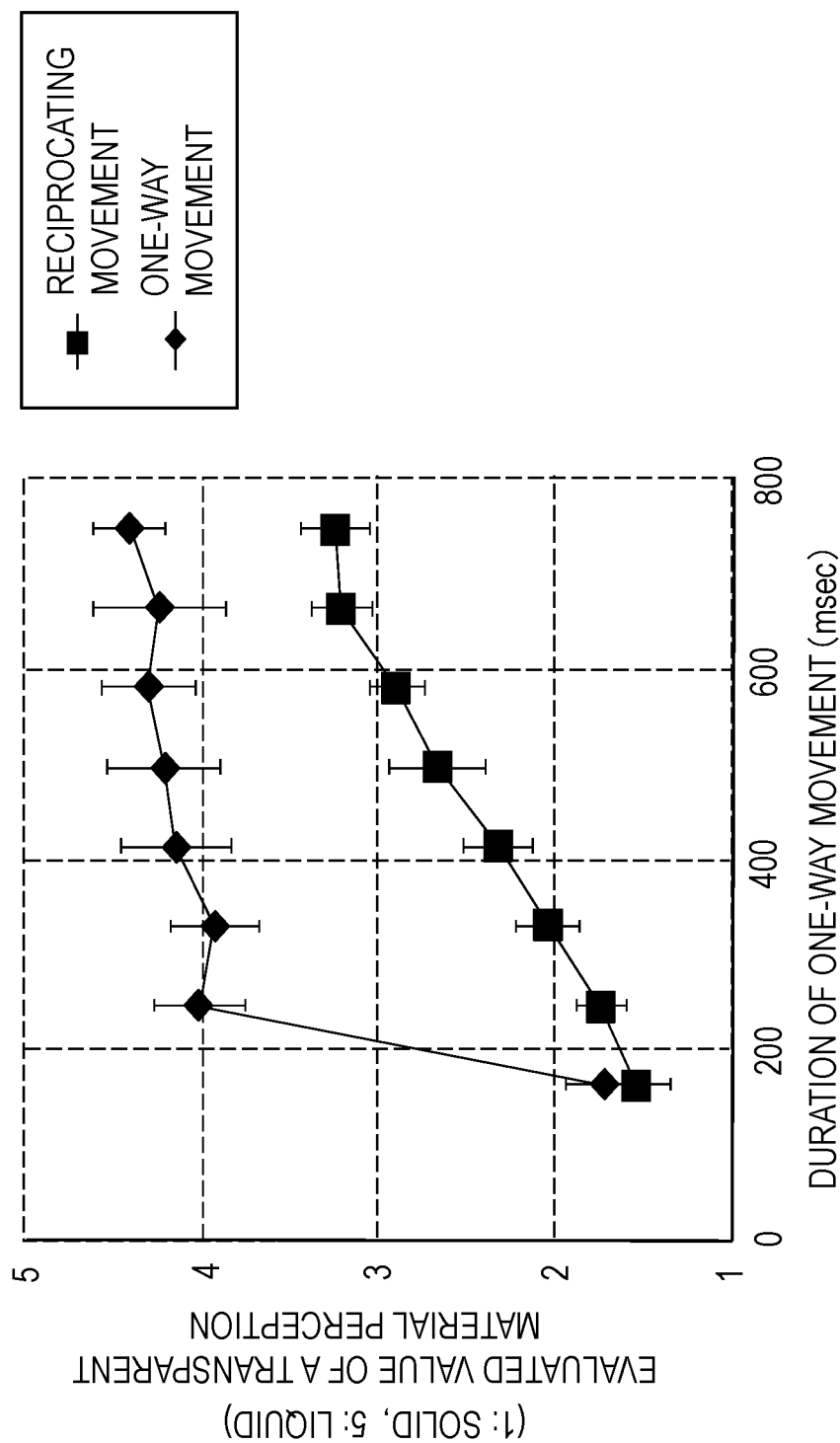
FIG. 5 is a graph exemplifying a relationship among a duration of one-way movement, a type of movement (reciprocating movement or one-way movement), and an evaluated value of a transparent material perception.

FIG. 5 shows, with respect to two cases, namely, a case where a dynamically deformed image sequence is generated using the vertical-direction three-dimensional deformation map $DM_V$ and the horizontal-direction three-dimensional deformation map $DM_H$(hereinafter, referred to as "three-dimensional deformation maps imparted with a reciprocal movement") described in the present embodiment and a case where a dynamically deformed image sequence is generated using three-dimensional deformation maps imparted with only a one-way movement, a relationship between an evaluated value of a transparent material perception with respect to a moving image that is obtained by arranging the dynamically deformed image sequence in a time-series direction and the duration of the one-way movement. It should be noted that the "duration of one-way movement" in three-dimensional deformation maps imparted with a reciprocal movement means a duration of a movement in one direction. As is apparent from FIG. 5, when using three-dimensional deformation maps imparted with only a one-way movement, with the exception of a case where the duration of the one-way movement is the shortest, the observer often perceives a transparent material perception of a liquid from the moving image. Conversely, in order to cause the transparent material perception perceived from a moving image to become biased toward a transparent material perception of a solid, there are two conceivable methods: using three-dimensional deformation maps imparted with a reciprocal movement; and using three-dimensional deformation maps imparted with only a one-way movement of which a duration is extremely short (for example, 100 msec or shorter). However, with a moving image obtained by the latter method, there is a possibility of the observer not even realizing that a moving image has been presented and the transparent material perception of a solid cannot be sufficiently presented. In the present embodiment, since the former method is adopted to generate a dynamically deformed image sequence using three-dimensional deformation maps imparted with a reciprocal movement, a transparent material perception of a solid can be imparted to an arbitrary target image P.

Second Embodiment

In the movement imparting processing of the first embodiment, a reciprocal movement is respectively imparted to three-dimensional noises $3DN_V$ and $3DN_H$. In other words, the three-dimensional noises $3DN_V$ and $3DN_H$ have an interval in which a movement in a d1 direction is imparted and an interval in which a movement in a d2 direction that is opposite to the d1 direction is imparted. However, the d2 direction need not be opposite to the d1 direction. The following description will focus on differences from the first embodiment, and common matters will be denoted using same reference numerals and descriptions thereof will be simplified.

Configuration and Processing of Present Embodiment

As exemplified in FIG. 1, an image generation apparatus 21 according to the present embodiment has the two-dimensional noise storage unit 110, a movement imparting unit 211, the filtering unit 112, the dynamic image deforming unit 113, and the moving image generating unit 114.

The present embodiment only differs from the processing in the first embodiment in movement imparting processing. Hereinafter, only the movement imparting processing of the second embodiment will be described. Otherwise, processing is as described in the first embodiment with the exception of the image generation apparatus 11 being replaced with the image generation apparatus 21 and the movement imparting unit 211 performing movement imparting processing in place of the movement imparting unit 111.

<Movement Imparting Processing>

The movement imparting unit 111 performs the following processing with respect to k=1, . . . , K. When a remainder of a division of k by 2T is any value between 1 and T, every time the value of k increases by 1, the movement imparting unit 111 obtains a two-dimensional noise $2DN_V(k)$ and a two-dimensional noise $2DN_H(k)$ which have elements that are the respective elements of a two-dimensional noise $2DN_V(k-1)$ and a two-dimensional noise $2DN_H(k-1)$ having been moved in a first direction (the d1 direction) set in advance by a movement amount of D. In addition, when a remainder of a division of k by 2T is any value between k+1 and 2T, every time the value of k increases by 1, the movement imparting unit 111 obtains a two-dimensional noise $2DN_V(k)$ and a two-dimensional noise $2DN_H(k)$ which have elements that are the respective elements of the two-dimensional noise $2DN_V(k-1)$ and the two-dimensional noise $2DN_H(k-1)$ having been moved in a second direction (the d2 direction that is a different direction from the d1 direction) set in advance that differs from the first direction by the movement amount D. Furthermore, in any of the cases described above, with respect to each element of which a value of the element was not obtained by the movement described above among the two-dimensional noise $2DN_V(k)$ and the two-dimensional noise $2DN_H(k)$, the movement imparting unit 111 sets a value randomly extracted from a uniform distribution or a normal distribution. It should be noted that elements that end up being outside of a range of an X×Y two-dimensional array as a result of the movement described above are not to be included in the two-dimensional noise $2DN_V(k)$ and the two-dimensional noise $2DN_H(k)$. In addition, the movement imparting unit 111 outputs a sequence of the two-dimensional noises $2DN_V(1), \ldots, 2DN_V(K)$ obtained by the processing described above as a three-dimensional noise $3DN_V$ and outputs a sequence of the two-dimensional noises $2DN_H(1), \ldots, 2DN_H(K)$ obtained by the processing described above as a three-dimensional noise $3DN_H$.

As shown in FIG. 6, an angle formed by the d1 direction and the d2 direction will be expressed as θ, where 0°≤θ<360°. A transparent material perception of a moving image that is finally obtained from a dynamically deformed image sequence DP differs depending on a magnitude of the angle θ. For example, when the angle θ is set to 135 degrees or more and 225 degrees or less, the observer perceives a transparent material perception of a solid from the moving image. When the angle θ is set to more than 0 degrees and 90 degrees or less or 270 degrees or more and less than 360 degrees, the observer perceives a transparent material perception of a liquid from the moving image. It should be noted that the second embodiment in a case where θ is 180 degrees is equivalent to the first embodiment.

First Modification of Second Embodiment

The angle θ may be manipulatable. Specifically, as exemplified in FIG. 1, the image generation apparatus 21 may further have an angle manipulating unit 215', in which case the movement imparting processing described in the second embodiment may be performed by having the angle manipulating unit 215' set the angle θ based on input information A that specifies the angle θ and output the angle θ and having the movement imparting unit 211 use the angle θ as an input to determine the d1 direction and the d2 direction such that an angle formed by the d1 direction and the d2 direction equals θ. Accordingly, the angle θ can be manipulated based on the input information A and a transparent material perception of a moving image that is finally obtained can be changed. Specifically, by bringing the angle θ close to 180 degrees, a liquid-likeness of the transparent material perception decreases while a solid-likeness thereof increases. Conversely, by bringing the angle θ away from 180 degrees, the solid-likeness of the transparent material perception decreases while the liquid-likeness thereof increases. It should be noted that the input information A may be the angle θ itself, an index representing a solid-likeness or a liquid-likeness, or information representing a solid or a liquid. For example, when the input information A is an index representing a solid-likeness or a liquid-likeness, the angle manipulating unit 215' may set the angle θ close to 180 degrees when the input information A indicates a high solid-likeness. Alternatively, the angle manipulating unit 215' may set the angle θ away from 180 degrees when the input information A indicates a high liquid-likeness. Alternatively, when the input information A is information representing a solid, the angle manipulating unit 215' may set the angle 9 to 135 degrees or more and 225 degrees or less, and when the input information A is information representing a liquid, the angle manipulating unit 215' may set the angle θ to more than 0 degrees and 90 degrees or less or 270 degrees or more and less than 360 degrees.

Other Modifications

The present invention is not limited to the embodiments described above. For example, a magnitude of the movement amount D may be manipulatable. Specifically, as exemplified in FIG. 1, the image generation apparatus 11 or 21 may further have a movement amount manipulating unit 216', in which case the movement amount manipulating unit 216' may set the movement amount D based on input information V that specifies the movement amount D and output the movement amount D, and the movement imparting unit 111 or 211 may receive the movement amount D as an input and use the input movement amount D to perform the movement imparting processing described in the first embodiment, the second embodiment, or the first modification of the second embodiment. As exemplified in FIG. 4, the higher a movement speed of one-way movement, the more the solid-likeness of the transparent material perception decreases and the liquid-likeness of the transparent material perception increases. In this case, since the larger the movement amount D, the higher the movement speed of one-way movement of the moving image M, the larger the movement amount D, the more the solid-likeness of the transparent material perception decreases and the liquid-likeness of the transparent material perception increases. In this manner, by manipulating a magnitude of the movement amount D, the solid-likeness and the liquid-likeness of the transparent material perception can be changed.

In addition, a magnitude of the number of frames T over which a one-way movement is to be continued may be manipulatable. Specifically, as exemplified in FIG. 1, the image generation apparatus 11 or 21 may further have a movement interval manipulating unit 217', in which case the movement interval manipulating unit 217' may set the number of frames T based on input information W that specifies the number of frames T and output the number of frames T, and the movement imparting unit 111 or 211 may receive the number of frames T as an input and use the input number of frames T to perform the movement imparting processing described in the first embodiment, the second embodiment, or the first modification of the second embodiment. As exemplified in FIG. 5, the longer a duration of one-way movement, the more the solid-likeness of the transparent material perception decreases and the liquid-likeness of the transparent material perception increases. Since the larger the number of frames T, the longer the duration of one-way movement, the larger the number of frames T, the more the solid-likeness of the transparent material perception decreases and the liquid-likeness of the transparent material perception increases. Accordingly, the solid-likeness and the liquid-likeness of the transparent material perception can be changed.

For example, in the movement imparting processing of the embodiments described above, $DN_V(k)$ and $2DN_H(k)$ of a k-th frame of any part may be the same as $DN_V(k-1)$ and $2DN_H(k-1)$ of an immediately previous k-1-th frame. In other words, in a part of the frames, the movement amount D may be 0. Otherwise, the movement amount D may differ among frames.

In addition, in the filtering unit 112 described above, the respective two-dimensional noises $2DN_V(k)$ and $2DN_H(k)$ subjected to a low-pass filter are expressed as $DM_V(k)$ and $DM_H(k)$. However, another filter may be used in place of the low-pass filter or filtering by another filter (for example, a Gaussian filter) may be performed in addition to the low-pass filter. Alternatively, the filtering unit 112 may be omitted, in which case the two-dimensional noises $2DN_V(k)$ and $2DN_H(k)$ may be adopted as-is as $DM_V(k)$ and $DM_H(k)$.

Furthermore, while the image generation apparatuses 11 and 21 generate three-dimensional deformation maps $DM_V$ and $DM_H$ in the first and second embodiments, dynamic image deformation processing may be performed using three-dimensional deformation maps $DM_V$ and $DM_H$ obtained in advance. In this case, the image generation apparatus 11 or 21 may be provided with a three-dimensional deformation map storage unit that stores the three-dimensional deformation maps $DM_V$ and $DM_H$ obtained in advance instead of being provided with the two-dimensional noise storage unit 110, the movement imparting unit 111 or 211, and the filtering unit 112.

The various types of processing described above may not only be executed in chronological order according to the descriptions but may also be executed in parallel or on an individual basis in accordance with processing capabilities of an apparatus to be used to execute the processing or as may be necessary. Furthermore, it is needless to say that the present invention can be appropriately modified without departing from the scope and spirit of the invention.

Summary

In the respective embodiments and the modification, in accordance with each element $e_V(x, y, k)$, $e_H(x, y, k)$ of each deformation map $DM_V(k)$, $DM_H(k)$ that is included in a sequence of deformation maps that correspond to a time series k=1, . . . , K, each pixel p(x, y) of a target image P is moved to obtain each deformed image DP(1), . . . , DP(K) of the time series. In this case, each element of each deformation map indicates a movement direction and a movement amount of each pixel p(x, y) of the target image P corresponding to each element $e_V(x, y, k)$, $e_H(x, y, k)$. In other words, a sign of $e_V(x, y, k)$ indicates a movement direction in a vertical direction of each pixel p(x, y), and an absolute value of $e_V(x, y, k)$ indicates a movement amount in the vertical direction of each pixel p(x, y). In a similar manner, a sign of $e_H(x, y, k)$ indicates a movement direction in a horizontal direction of each pixel p(x, y), and an absolute value of $e_H(x, y, k)$ indicates a movement amount in the horizontal direction of each pixel p(x, y). Each deformation map $DM_V(k)$, $DM_H(k)$ included in a series of deformation maps corresponding to a first time interval (for example, k=1, . . . , T) in the time series k=1, . . . , K corresponds to each of two-dimensional arrays (each of two-dimensional noises $2DN_V(k)$, $2DN_H(k)$) obtained by moving, in a first direction (a d1 direction), elements of each of two-dimensional arrays (each of two-dimensional noises $2DN_V(k-1)$, $2DN_H(k-1)$) that correspond to immediately-previous deformation maps $DM_V(k-1)$, $DM_H(k-1)$. Each deformation map $DM_V(k)$, $DM_H(k)$ included in a series of deformation maps corresponding to a second time interval (for example, k=T+1, . . . , 2T) in the time series k=1, . . . , K corresponds to each of two-dimensional arrays (each of two-dimensional noises $2DN_V(k)$, $2DN_H(k)$) obtained by moving, in a second direction (a d2 direction), elements of each of two-dimensional arrays (each of two-dimensional noises $2DN_V(k-1)$, $2DN_H(k-1)$) that correspond to immediately-previous deformation maps $DM_V(k-1)$, $DM_H(k-1)$. Here, the first direction differs from the second direction. It should be noted that each deformation map $DM_V(k)$, $DM_H(k)$ is obtained by performing filtering processing on each two-dimensional noise $2DN_V(k)$, $2DN_H(k)$ that corresponds to each deformation map $DM_V(k)$, $DM_H(k)$. Alternatively, each two-dimensional noise $2DN_V(k)$, $2DN_H(k)$ may be adopted as-is as each deformation map $DM_V(k)$, $DM_H(k)$.

For example, in accordance with each element $e_V(x, y, k)$, $e_H(x, y, k)$ of each deformation map $DM_V(k)$, $DM_H(k)$ that is included in a sequence of deformation maps that correspond to a time series k=1, . . . , K constituted by a plurality of time intervals (m=1, 2, . . . , 2×(μ+1)), the dynamic image deforming unit 113 moves each pixel p(x, y) of a target image P to obtain each deformed image DP(1), . . . , DP(K) of a time series. Each deformation map $DM_V(k)$, $DM_H(k)$ included in a series of deformation maps $DM_V(1)$, . . . , $DM_V(T)$, $DM_V(1+2T)$, . . . , $DM_V(3T)$, . . . , $DM_V(1+(2×μ)T)$, . . . , $DM_V((2× μ+1) T)$, $DM_H(1)$, . . . , $DM_H(T)$, $DM_H(1+2T)$, . . . , $DM_H(3T)$, . . . , $DM_H(1+(2×9)T)$, . . . , $DM_H((2×μ+1)T)$ corresponding to an odd-numbered time interval (m=1, 3, . . . , 2× μ+1) in the time series k=1, . . . , K corresponds to two-dimensional arrays (two-dimensional noises $2DN_V(k)$, $2DN_H(k)$) obtained by moving, in a first direction (the d1 direction), elements of two-dimensional arrays (two-dimensional noises $2DN_V(k-1)$, $2DN_H(k-1)$) that corresponds to immediately-previous deformation maps $DM_V(k-1)$, $DM_H(k-1)$. Each deformation map $DM_V(k)$, $DM_H(k)$ included in a series of deformation maps $DM_V(1+T)$, . . . , $DM_V(2T)$, $DM_V(1+3T)$, . . . , $DM_V(4T)$, . . . , $DM_V(1+(2×μ+1)T)$, . . . , $DM_V((2×(μ+1)T)$, $DM_H(1+T)$, . . . , $DM_H(2T)$, $DM_H(1+3T)$, . . . , $DM_H(4T)$, . . . , $DM_H(1+(2×μ+1) T)$, . . . , $DM_H((2×(μ+1) T)$ corresponding to an even-numbered time interval (m=2, 4, . . . , 2×(μ+1)) in the time series k=1, . . . , K corresponds to two-dimensional arrays (two-dimensional noises $2DN_V(k)$, $2DN_H(k)$) obtained by moving, in a second direction (the d2 direction), elements of two-dimensional arrays (two-dimensional noises $2DN_V(k-1)$, $2DN_H(k-1)$) that correspond to immediately-previous deformation maps $DM_V(k-1)$, $DM_H(k-1)$.

The moving image generating unit 114 generates a moving image M obtained by arranging the sequence DP(1), . . . , DP(K) of the deformed images DP(k) in a time-series direction at a predetermined frame rate. An observer of the moving image M perceives a transparent material perception of a solid or a liquid.

When an angle θ formed by the first direction (the d1 direction) and the second direction (the d2 direction) is 135 degrees or more and 225 degrees or less, the observer perceives a transparent material perception of a solid. When the angle θ formed by the first direction and the second direction is more than 0 degrees and 90 degrees or less or 270 degrees or more and less than 360 degrees, the observer perceives a transparent material perception of a liquid.

The angle θ formed by the first direction and the second direction may be manipulatable. Accordingly, the solid-likeness and the liquid-likeness of the transparent material perception that is perceived by the observer can be changed.

A movement amount D of two-dimensional arrays (the two-dimensional noises $2DN_V(k-1)$, $2DN_H(k-1)$) that correspond to immediately-previous deformation maps $DM_V(k-1)$, $DM_H(k-1)$ may be manipulatable. Specifically, each deformation map $DM_V(k)$, $DM_H(k)$ included in a sequence of deformation maps corresponding to the first time interval corresponds to each of two-dimensional arrays (each of the two-dimensional noises $2DN_V(k)$, $2DN_H(k)$) obtained by moving, in the first direction (the d1 direction) by a second movement amount D, elements of the two-dimensional arrays (the two-dimensional noises $2DN_V(k-1)$, $2DN_H(k-1)$) that corresponds to immediately-previous deformation maps $DM_V(k-1)$, $DM_H(k-1)$. In addition, each deformation map $DM_V(k)$, $DM_H(k)$ included in a sequence of deformation maps corresponding to the second time interval corresponds to each of two-dimensional arrays (each of the two-dimensional noises $2DN_V(k)$, $2DN_H(k)$) obtained by moving, in the second direction (the d2 direction) by the second movement amount D, elements of the two-dimensional arrays (the two-dimensional noises $2DN_V(k-1)$, $2DN_H(k-1)$) that correspond to immediately-previous deformation maps $DM_V(k-1)$, $DM_H(k-1)$. In doing so, the image generation apparatus (for example, the movement amount manipulating unit 216' of the image generation apparatus) may be capable of manipulating the second movement amount D. Accordingly, the solid-likeness and the liquid-likeness of the transparent material perception that is perceived by the observer can be similarly changed.

Furthermore, the image generation apparatus (for example, the movement interval manipulating unit 217' of the image generation apparatus) may be capable of manipulating a length T of the first time interval and a length T of the second time interval. Accordingly, the solid-likeness and the liquid-likeness of the transparent material perception that is perceived by the observer can be similarly changed.

[Hardware and Software Configurations]

The respective apparatuses described above are configured by, for example, having a general-purpose computer or a dedicated computer equipped with a processor (a hardware processor) such as a CPU (central processing unit), a memory such as a RAM (random-access memory) or a ROM (read-only memory), and the like execute a prescribed program. The computer may be equipped with one processor and one memory or a plurality of processors and a plurality of memories. The program may be installed on the computer or may be recorded in advance in the ROM or the like. In addition, a part of or all of the processing units may be configured using circuitry that realizes a processing function without using a program instead of circuitry such as a CPU that realizes a processing function when a program is loaded. Circuitry constituting one apparatus may include a plurality of CPUs.

When realizing the configurations described above with a computer, processing contents of a function which each apparatus must be equipped with are described by a program. The processing functions described above are realized on the computer by having the computer execute the program. The program describing the processing contents can be recorded in a computer-readable recording medium. An example of the computer-readable recording medium is a non-transitory recording medium. Examples of such a recording medium include a magnetic recording apparatus, an optical disk, a magneto-optical recording medium, and a semiconductor memory.

The program is distributed by, for example, selling, transferring, or lending a portable recording medium such as a DVD or a CD-ROM on which the program is recorded. Furthermore, a configuration may be adopted in which the program is stored in a storage apparatus of a server computer and the server computer transmits the program to other computers via network in order to distribute the program.

For example, a computer that executes such a program first temporarily stores a program recorded in a portable recording medium or a program transmitted from a server computer in its own storage apparatus. When executing processing, the computer reads the program stored in its own storage apparatus and executes processing in accordance with the read program. As an alternative execution mode of the program, a computer may read a program directly from a portable recording medium and execute processing in accordance with the program or, every time the program is transmitted from a server computer to the computer, the computer may sequentially execute processing in accordance with the received program. A configuration may be adopted in which a program is not transmitted to the computer from a server computer and the processing described above is executed by a so-called ASP (Application Service Provider) type service which realizes a processing function only by issuing an execution instruction and acquiring a result thereof.

Instead of executing a prescribed program on a computer to realize processing functions of the present apparatus, at least a part of the processing functions may be realized by hardware.

INDUSTRIAL APPLICABILITY

The present invention can be expected to be used when changing a transparent liquid material perception in fields of computer graphics software, image editing software, art, and the like.

REFERENCE SIGNS LIST

11, 21 Image generation apparatus

The invention claimed is:

1. An image generation apparatus comprising processing circuitry configured to
   obtain each of deformed images of a time series by moving each of pixels of a target image in accordance with each of elements of each deformation map included in a sequence of deformation maps that correspond to the time series, wherein
   each of the elements of each of the deformation maps indicates a movement direction and a movement amount to each of pixels of the deformed images from each of the pixels of the target image corresponding to each of the elements,
   the sequence of deformation maps includes a first sequence of deformation maps corresponding to a first time interval in the time series and a second sequence of deformation maps corresponding to a second time interval in the time series,
   each of the deformation maps included in the first sequence of deformation maps corresponds to moving the pixels of each of the deformed images of immediately previous times of respective times in the first time interval in a first direction,
   each of the deformation maps included in the second sequence of deformation maps corresponds to moving the pixels of each of the deformed images of immediately previous times of respective times in the second time interval in a second direction, and
   the first direction and the second direction differ from one another.

2. An image generation apparatus comprising processing circuitry configured to obtain a deformed image sequence which is a sequence of deformed images which are obtained by moving each of pixels of a target image, wherein
   the deformed image sequence includes a first deformed image sequence which is the sequence of the deformed images in a first time interval and a second deformed image sequence which is the sequence of the deformed images in a second time interval,
   each of the deformed images included in the first deformed image sequence is an image which is obtained by moving pixels of each of the deformed images of immediately previous times of respective times in the first time interval in a first direction,
   each of the deformed images included in the second deformed image sequence is an image which is obtained by moving pixels of each of the deformed images of immediately previous times of respective times in the second time interval in a second direction, and the first direction and the second direction differ from one another.

3. An image generation apparatus comprising processing circuitry configured to obtain each of deformed images of a time series by moving each of pixels of a target image, in accordance with each of elements of each deformation map included in a sequence of deformation maps that correspond to the time series constituted by a plurality of time intervals wherein each of the elements of each of the deformation maps indicates a movement direction and a movement amount to each of pixels of the deformed images from each of the pixels of the target image corresponding to each of the elements, the sequence of deformation maps includes a first sequence of deformation maps corresponding to an odd-numbered time interval in the time series and a second sequence of deformation maps corresponding to an even-numbered time interval in the time series, each of the deformation maps included in the first sequence of deformation maps corresponds to moving the pixels of each of the deformed images of immediately previous times of respective times in the first time interval in a first direction, each of the deformation maps included in the second sequence of deformation maps corresponds to moving the pixels of each of the deformed images of immediately previous times of respective times in the second time interval in a second direction, and the first direction and the second direction differ from one another.

4. The image generation apparatus according to claim 1 or 3, wherein an angle formed by the first direction and the second direction is 135 degrees or more and 225 degrees or less.

5. The image generation apparatus according to claim 1 or 3, wherein the angle formed by the first direction and the second direction is more than 0 degrees and 90 degrees or less or 270 degrees or more and less than 360 degrees.

6. The image generation apparatus according to claim 1 or 3, wherein the processing circuitry is configured to further manipulate the angle formed by the first direction and the second direction.

7. The image generation apparatus according to claim 1 or 3, wherein each of the deformation maps included in the first sequence of deformation maps corresponds to moving the pixels of each of the deformed images of immediately previous times of respective times in the first time interval in the first direction by a second movement amount, each of the deformation maps included in the second sequence of deformation maps corresponds to moving the pixels of each of the deformed images of immediately previous times of respective times in the second time interval in the second direction by the second movement amount, and the processing circuitry is configured to further manipulate the second movement amount.

8. The image generation apparatus according to claim 1 or 3, wherein the processing circuitry is configured to further manipulate a length of the time interval.

9. An image generation method of an image generation apparatus, comprising:

a dynamic image deformation step of obtaining each of deformed images of a time series by moving each of pixels of a target image in accordance with each of elements of each deformation map included in a sequence of deformation maps that correspond to the time series, wherein each of the elements of each of the deformation maps indicates a movement direction and a movement amount to each of pixels of the deformed images from each of the pixels of the target image corresponding to each of the elements, the sequence of deformation maps includes a first sequence of deformation maps corresponding to a first time interval in the time series and a second sequence of deformation maps corresponding to a second time interval in the time series, each of the deformation maps included in the first sequence of deformation maps corresponds to moving the pixels of each of the deformed images of immediately previous times of respective times in the first time interval in a first direction, each of the deformation maps included in the second sequence of deformation maps corresponds to moving the pixels of each of the deformed images of immediately previous times of respective times in the second time interval in a second direction, and the first direction and the second direction differ from one another.

10. An image generation method of an image generation apparatus, comprising:

a dynamic image deformation step, of obtaining each of deformed images of a time series by moving each of pixels of a target image in accordance with each of elements of each deformation map included in a sequence of deformation maps that correspond to the time series constituted by a plurality of time intervals, wherein each of the elements of each of the deformation maps indicates a movement direction and a movement amount to each of pixels of the deformed images from each of the pixels of the target image corresponding to each of the elements, the sequence of deformation maps includes a first sequence of deformation maps corresponding to an odd-numbered time interval in the time series and a second sequence of deformation maps corresponding to an even-numbered time interval in the time series, each of the deformation maps included in the first sequence of deformation maps corresponds to moving the pixels of each of the deformed images of immediately previous times of respective times in the first time interval in a first direction, each of the deformation maps included in the second sequence of deformation maps corresponds to moving the pixels of each of the deformed images of immediately previous times of respective times in the second time interval in a second direction, and the first direction and the second direction differ from one another.

11. A non-transitory computer-readable recording medium storing a program for causing a computer to function as the image generation apparatus according to any one of claims 1, 3, or 2.

12. An image generation method of obtaining a deformed image sequence which is a sequence of deformed images which are obtained by moving each of pixels of a target image, wherein > the deformed image sequence includes a first deformed image sequence which is the sequence of the deformed images in a first time interval and a second deformed image sequence which is the sequence of the deformed images in a second time interval,
>
> each of the deformed images included in the first deformed image sequence is an image which is obtained by moving pixels of each of the deformed images of immediately previous times of respective times in the first time interval in a first direction,
>
> each of the deformed images included in the second deformed image sequence is an image which is obtained by moving pixels of each of the deformed images of immediately previous times of respective times in the second time interval in a second direction, and the first direction and the second direction differ from one another.

\* \* \* \* \*